United States Patent
Nakaya

(10) Patent No.: US 10,345,926 B2
(45) Date of Patent: Jul. 9, 2019

(54) INCLINATION DERIVATION DEVICE AND METHOD

(71) Applicant: LG DISPLAY CO., LTD., Seoul (KR)

(72) Inventor: Hideo Nakaya, Tokyo (JP)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/888,842

(22) Filed: Feb. 5, 2018

(65) Prior Publication Data

US 2018/0224951 A1     Aug. 9, 2018

(30) Foreign Application Priority Data

Feb. 6, 2017   (JP) .................. 2017-019288

(51) Int. Cl.
*G06F 3/0346* (2013.01)
*G06F 3/0354* (2013.01)
*G01C 9/06* (2006.01)
*G06F 3/038* (2013.01)

(52) U.S. Cl.
CPC .......... *G06F 3/0346* (2013.01); *G01C 9/06* (2013.01); *G06F 3/038* (2013.01); *G06F 3/0383* (2013.01); *G06F 3/03545* (2013.01); *G01C 2009/062* (2013.01); *G06F 2203/0384* (2013.01)

(58) Field of Classification Search
CPC .... G06F 3/03545; G06F 3/0346; G06F 3/038; G06F 3/0383; G06F 2203/0384; G01C 9/06; G01C 2009/062
See application file for complete search history.

(56) References Cited

U.S. PATENT DOCUMENTS

2012/0327042 A1* 12/2012 Harley ................ G06F 3/03545
                                                            345/179

FOREIGN PATENT DOCUMENTS

JP    2011-164801 A    8/2011
KR    10-2013-0034777 A    4/2013

* cited by examiner

*Primary Examiner* — Christopher J Kohlman
(74) *Attorney, Agent, or Firm* — Birch, Stewart, Kolasch & Birch, LLP

(57) ABSTRACT

An inclination derivation device of a pointer of a pen shape, is discussed with the pointer including a first electrode installed at an end of an axis and a second electrode installed around the axis. The inclination derivation device includes a sensor of a plane shape that detects a position of the first electrode and a position of the second electrode, and a control portion. The control portion includes a look-up table (LUT) in which a corresponding relation of a value based on a difference between the position of the first electrode and the position of the second electrode, and a compensation value that becomes a base of an inclination of the axis of the pointer is registered; an input value calculation portion that calculates and inputs the value based on the difference to the LUT; and an inclination derivation portion that derives the inclination from the compensation value output from the LUT.

18 Claims, 11 Drawing Sheets

FIG. 4

| D1<br>(−2, −2) | D2<br>(−2, −1) | D3<br>(−2, 0) | D4<br>(−2, 1) | D5<br>(−2, 2) |
|---|---|---|---|---|
| D6<br>(−1, −2) | D7<br>(−1, −1) | D8<br>(−1, 0) | D9<br>(−1, 1) | D10<br>(−1, 2) |
| D11<br>(0, −2) | D12<br>(0, −1) | D13<br>(0, 0) | D14<br>(0, 1) | D15<br>(0, 2) |
| D16<br>(1, −2) | D17<br>(1, −1) | D18<br>(1, 0) | D19<br>(1, 1) | D20<br>(1, 2) |
| D21<br>(2, −2) | D22<br>(2, −1) | D23<br>(2, 0) | D24<br>(2, 1) | D25<br>(2, 2) |

FIG. 6A

| Adress | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 3 | 4 | 4 | 5 | 6 | 6 | 8 | 9 | 9 | 10 | 10 | 11 | 11 | 12 | 12 |
| 1 | 0 | 3 | 4 | 4 | 5 | 6 | 6 | 8 | 9 | 9 | 10 | 10 | 11 | 11 | 12 | 12 |
| 2 | 0 | 3 | 4 | 4 | 5 | 6 | 6 | 8 | 9 | 9 | 10 | 10 | 11 | 11 | 12 | 12 |
| 3 | 0 | 3 | 4 | 4 | 5 | 6 | 6 | 8 | 9 | 9 | 10 | 10 | 11 | 11 | 12 | 12 |
| 4 | 0 | 3 | 4 | 4 | 5 | 6 | 6 | 8 | 9 | 9 | 10 | 10 | 11 | 11 | 12 | 12 |
| 5 | 0 | 3 | 4 | 4 | 5 | 6 | 6 | 8 | 9 | 9 | 10 | 10 | 11 | 11 | 12 | 12 |
| 6 | 0 | 3 | 4 | 4 | 5 | 6 | 6 | 8 | 9 | 9 | 10 | 10 | 11 | 11 | 12 | 12 |
| 7 | 0 | 3 | 4 | 4 | 5 | 6 | 6 | 8 | 9 | 9 | 10 | 10 | 11 | 11 | 12 | 12 |
| 8 | 0 | 3 | 4 | 4 | 5 | 6 | 6 | 8 | 9 | 9 | 10 | 10 | 11 | 11 | 12 | 12 |
| 9 | 0 | 3 | 4 | 4 | 5 | 6 | 6 | 8 | 9 | 9 | 10 | 10 | 11 | 11 | 12 | 12 |
| 10 | 0 | 3 | 4 | 4 | 5 | 6 | 6 | 8 | 9 | 9 | 10 | 10 | 11 | 11 | 12 | 12 |
| 11 | 0 | 3 | 4 | 4 | 5 | 6 | 6 | 8 | 9 | 9 | 10 | 10 | 11 | 11 | 12 | 12 |
| 12 | 0 | 3 | 4 | 4 | 5 | 6 | 6 | 8 | 9 | 9 | 10 | 10 | 11 | 11 | 12 | 12 |
| 13 | 0 | 3 | 4 | 4 | 5 | 6 | 6 | 8 | 9 | 9 | 10 | 10 | 11 | 11 | 12 | 12 |
| 14 | 0 | 3 | 4 | 4 | 5 | 6 | 6 | 8 | 9 | 9 | 10 | 10 | 11 | 11 | 12 | 12 |
| 15 | 0 | 3 | 4 | 4 | 5 | 6 | 6 | 8 | 9 | 9 | 10 | 10 | 11 | 11 | 12 | 12 |

FIG. 6B

| Adress | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 2 | 2 | 2 | 2 | 2 | 2 | 2 | 2 | 2 | 2 | 2 | 2 | 2 | 2 | 2 | 2 |
| 2 | 4 | 4 | 4 | 4 | 4 | 4 | 4 | 4 | 4 | 4 | 4 | 4 | 4 | 4 | 4 | 4 |
| 3 | 5 | 5 | 5 | 5 | 5 | 5 | 5 | 5 | 5 | 5 | 5 | 5 | 5 | 5 | 5 | 5 |
| 4 | 6 | 6 | 6 | 6 | 6 | 6 | 6 | 6 | 6 | 6 | 6 | 6 | 6 | 6 | 6 | 6 |
| 5 | 6 | 6 | 6 | 6 | 6 | 6 | 6 | 6 | 6 | 6 | 6 | 6 | 6 | 6 | 6 | 6 |
| 6 | 8 | 8 | 8 | 8 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 | 8 | 8 | 8 | 8 |
| 8 | 8 | 8 | 8 | 8 | 8 | 8 | 8 | 8 | 8 | 8 | 8 | 8 | 8 | 8 | 8 | 8 |
| 9 | 9 | 9 | 9 | 9 | 9 | 9 | 9 | 9 | 9 | 9 | 9 | 9 | 9 | 9 | 9 | 9 |
| 10 | 9 | 9 | 9 | 9 | 9 | 9 | 9 | 9 | 9 | 9 | 9 | 9 | 9 | 9 | 9 | 9 |
| 11 | 9 | 9 | 9 | 9 | 9 | 9 | 9 | 9 | 9 | 9 | 9 | 9 | 9 | 9 | 9 | 9 |
| 12 | 10 | 10 | 10 | 10 | 10 | 10 | 10 | 10 | 10 | 10 | 10 | 10 | 10 | 10 | 10 | 10 |
| 13 | 10 | 10 | 10 | 10 | 10 | 10 | 10 | 10 | 10 | 10 | 10 | 10 | 10 | 10 | 10 | 10 |
| 14 | 11 | 11 | 11 | 11 | 11 | 11 | 11 | 11 | 11 | 11 | 11 | 11 | 11 | 11 | 11 | 11 |
| 15 | 11 | 11 | 11 | 11 | 11 | 11 | 11 | 11 | 11 | 11 | 11 | 11 | 11 | 11 | 11 | 11 |

FIG. 9

|  |  | $\theta x$ |
|---|---|---|
| Before compensation | average error value | 0.2 |
|  | minimum error value | -8.0 |
|  | maximum error value | 7.6 |
| After compensation | average error value | 0.4 |
|  | minimum error value | -3.0 |
|  | maximum error value | 2.7 |

INCLINATION DERIVATION DEVICE AND METHOD

CROSS-REFERENCE TO RELATED APPLICATION

The present application claims the priority benefit of Japanese Patent Application No. 2017-019288 filed in Japan on Feb. 6, 2017, which is hereby incorporated by reference in its entirety for all purposes as if fully set forth herein.

BACKGROUND OF THE INVENTION

Field of the Invention

The present invention relates to an inclination derivation device and method.

Discussion of the Related Art

Recently, a position detection device, such as a touch panel, that has a sensor, such as a touch pad, combined with and installed on a display device, such as a liquid crystal panel, is widely used.

An input to the position detection device may be conducted using a stylus pen having a sharp shape at a front end when, for example, a precise input to the position detection device is needed. Various kinds of stylus pens are used currently, and particularly, among them, an active capacitive coupling type stylus pen is supplied.

As shown in FIG. 11, an active capacitive coupling type stylus pen 101 includes a plurality of, for example, two electrodes that are a first electrode 101a and a second electrode 101b, and a driving power source to drive the first and second electrodes 101a and 101b. The first electrode 101a is installed at an end on an axis C of the stylus pen 101, and the second electrode 101b is installed with a ring shape around the axis C, for example, surrounding the axis C. A signal which each of the first and second electrodes 101a and 101b driven by the driving power source transmits is received by a sensor 100a of a position detection device 100, and thus a position pointed by the stylus pen 101 is detected.

A patent literature 1 (Japanese Patent Application Publication No. 2011-164801) discloses the supporter, the position detection device and the position detection method as above.

According to a program, operated on the position detection device, using the above stylus pen, i.e., the pointer and the position detection device, an inclination of the pointer with respect to the position detection device may be needed as an input. In this case, generally, when detection coordinates of the first and second electrodes 101a and 101b on an XY plane are A and B, and a distance between the first and second electrodes 101a and 101b on the axis C of the pointer 101 is L, an inclination of the axis C is derived from an arithmetic operation based on the values A, B and L.

In the case of using the pointer 101 shown in FIG. 11, the first electrode 101a is close to the position detection device 100 while the second electrode 101b is located a height H away from the position detection device 100. Thus, compared with the first electrode 101a, a detection value of the second electrode 101b by the sensor 100a is smaller.

Further, since the second electrode 101b is formed with a ring shape around the axis C, for example, surrounding the axis C and has a volume greater than the first electrode 101a, a range to be detected as the second electrode 101b by the sensor 100a is great.

As such, the sensor 100a detects a region, where a small detection value are distributed widely, as the position of the second electrode 101b, and thus it is not easy that the position detection device 100 precisely specifies the detection coordinate B of the second electrode 101b that becomes a base for the calculation of the inclination.

Since the second electrode 101b is formed with a ring shape around the axis C, for example, surrounding the axis C, a shape of a region that the position detection device 100 detects as the position of the second electrode 101b changes according to the inclination of the pointer 101 and is not constant. Thus, based on, for example, a shape of a region corresponding to the second electrode 101b, it is not easy to specify the coordinate B.

Further, the second electrode 101b is installed at a position of a certain distance away from the axis C. Thus, according to the inclination of the pointer 101, a value of the distance L between the first and second electrodes 101a and 101b to be considered in the calculation is strictly different.

Further, since the detection value of the second electrode 101b by the sensor 100a is small, when a noise intervenes, the noise has a great influence and it is difficult to specify the coordinate B.

Since the above factors act synergistically and it is difficult to precisely specify the coordinate B, the value of the specified coordinate B tends to largely have an error. As a result, based on the value of the specified coordinate B as above, a precision of the inclination derived purely from an arithmetic operation is not high.

Further, the position detection device 100 may be loaded into a device, such as a smart phone, that does not have a high processing capability. In the device not having a high processing capability, it is not easy to derive an inclination from a complex arithmetic operation, thus an execution of an application using an inclination is delayed and further execution of other functions of the device may fail.

SUMMARY

Accordingly, the present invention is directed to an inclination derivation device and method that substantially obviate one or more of the problems due to limitations and disadvantages of the related art.

An advantage of the present invention is to provide an inclination derivation device and method that can derive an inclination of a pointer precisely with a small amount of calculation.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present invention, as embodied and broadly described herein, an inclination derivation device for a pointer of a pen shape, is provided where the pointer includes a first electrode installed at an end of an axis and a second electrode installed around the axis. The device includes a sensor of a plane shape that detects a position of the first electrode and a position of the second electrode; and a control portion, wherein the control portion includes a look-up table (LUT) in which a corresponding relation of a value based on a difference between the position of the first electrode and the position of the second electrode, and a compensation value that becomes a base of an inclination of the axis of the pointer is registered; an input value calculation portion that calculates and inputs the value based on the difference to the LUT; and an inclination derivation portion that derives the inclination from the compensation value output from the LUT.

In another aspect, an inclination derivation method for a pointer of a pen shape that includes a first electrode installed at an end of an axis and a second electrode installed around the axis, includes detecting a position of the first electrode and a position of the second electrode by a sensor of a plane shape; calculating a value based on a difference between the position of the first electrode and the position of the second electrode; inputting the value based on the difference to a look-up table (LUT) in which a corresponding relation of the value based on the difference and a compensation value that becomes a base of an inclination of the axis of the pointer is registered; and deriving the inclination from the compensation value output from the LUT.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIG. 4 is a view illustrating a center calculation portion of a control portion of an inclination derivation device according to the embodiment of the present invention;

FIGS. 6A and 6B are views illustrating an example of an LUT of an inclination derivation device according to the embodiment of the present invention;

FIGS. 8A, 8B and 9 are views of a experiment result according to the embodiment of the present invention;

DETAILED DESCRIPTION OF THE EMBODIMENTS

Reference will now be made in detail to embodiments, examples of which are illustrated in the accompanying drawings. The same or like reference numbers may be used throughout the drawings to refer to the same or like parts.

Figure 1:
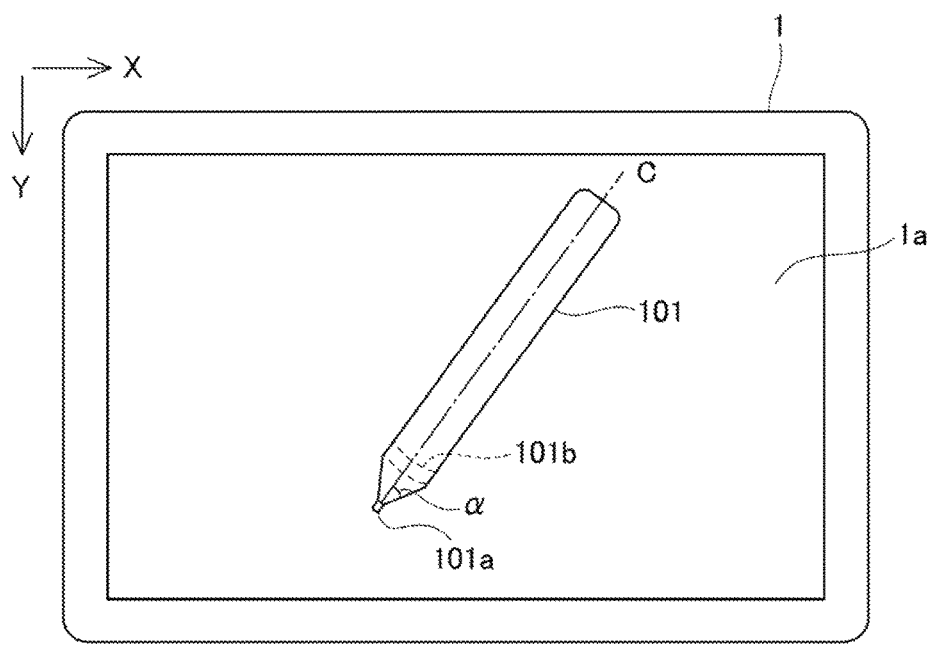
FIG. 1 is a view illustrating an inclination derivation device according to an embodiment of the present invention and a pointer used with the same.
Figure 2:
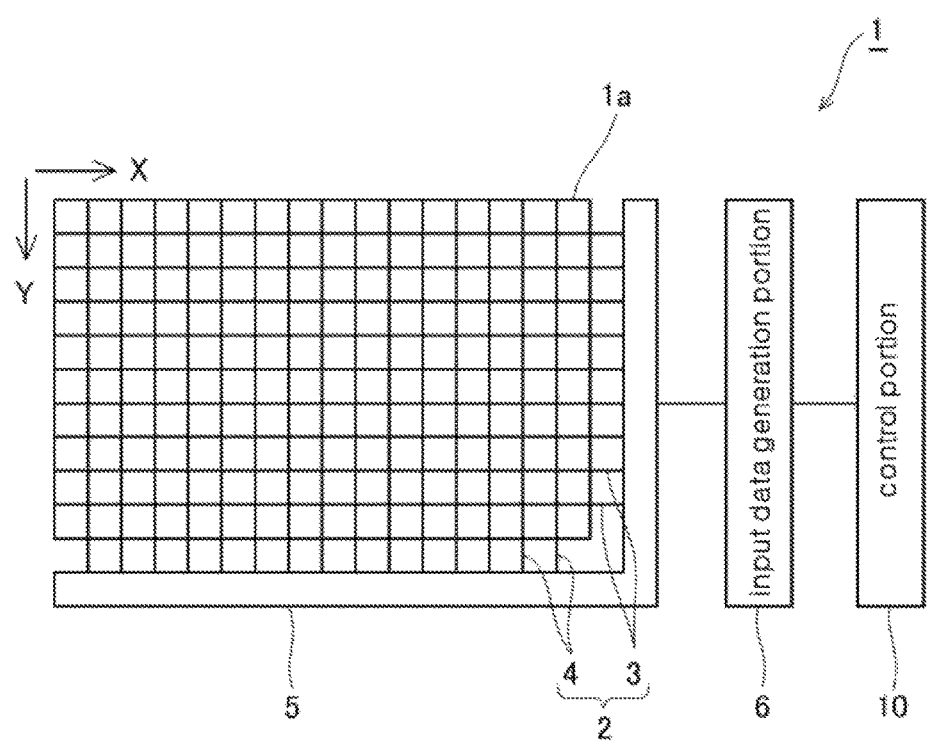
FIG. 2 is a view illustrating an inclination derivation device according to the embodiment of the present invention.

FIG. 1 is a view illustrating an inclination derivation device 1 according to an embodiment of the present invention and a pointer 101 used with the same. FIG. 2 is a view illustrating the inclination derivation device 1. All the components of the inclination derivation device according to all embodiments of the present invention are operatively coupled and configured.

Referring to FIGS. 1 and 2, a pointer 101 has a pen shape, and includes a first electrode 101a installed at an end on a direction of an axis C, a second electrode 101b installed around the axis C, and a driving power source to drive the first and second electrodes 101a and 101b.

In this embodiment, the second electrode 101b is installed with a ring shape surrounding the axis C.

The first and second electrodes 101a and 101b are capacitively coupled with a sensor 2 of the inclination derivation device 1 to transmit a signal to the inclination derivation device 1.

In this embodiment, the inclination derivation device 1 may be a tablet type information terminal. The inclination derivation device 1 includes the sensor 2 that is on a display device, such as a liquid crystal panel, has a plane shape and is a capacitive type sensor. The sensor 2 is installed mostly over an entire surface of a display region of the liquid crystal panel, and all the display region is considered as a position sensing available region 1a by the sensor 2. When the pointer 101 is located within the position sensing available region 1a, the sensor 2 detects a position of the first electrode 101a and a position of the second electrode 101b, and detects a position pointed by the pointer 101.

The sensor 2 includes a plurality of first direction conductors 3 extending in a first direction and a plurality of second direction conductors 4 extending in a second direction. In this embodiment, the first direction may be a direction X that is a lateral direction on a ground, and the second direction may be a direction Y that is a longitudinal direction on a ground.

The first direction conductors 3 and the second direction conductors 4 are configured to have a sparse lattice shape compared with pixels of the display device, such that one first direction conductor 3 and one second direction conductor 4 each correspond to a predetermined number of pixels of the display device.

The inclination derivation device 1 includes a selection circuit 5. An end of each first direction conductor 3 and an end of each second direction conductor 4 are connected to the selection circuit 5. The selection circuit 5 selects the first direction conductors 3 in a predetermined order and the second direction conductors 4 in a predetermined order, and receives signals transmitted from the first and second electrodes 101a and 101b to the first and second direction conductors 3 and 4.

The selection circuit 5 transmits the signals received from the first and second conductors 3 and 4 to an input data generation portion 6.

The inclination derivation device 1 includes the input data generation portion 6. The input data generation portion 6 classifies the signals from the selection circuit 5 into a signal from the first electrode 101a and a signal from the second electrode 101b, and transmits the signal from the first electrode 101a as a first electrode signal and the signal from the second electrode 101b as a second electrode signal to a control portion 10.

This classification may be made, for example, by the sensor 2 and the selection circuit 5 performing receiving signals from the first electrodes 101a and receiving signals from the second electrodes 101b with a time division.

Figure 3:
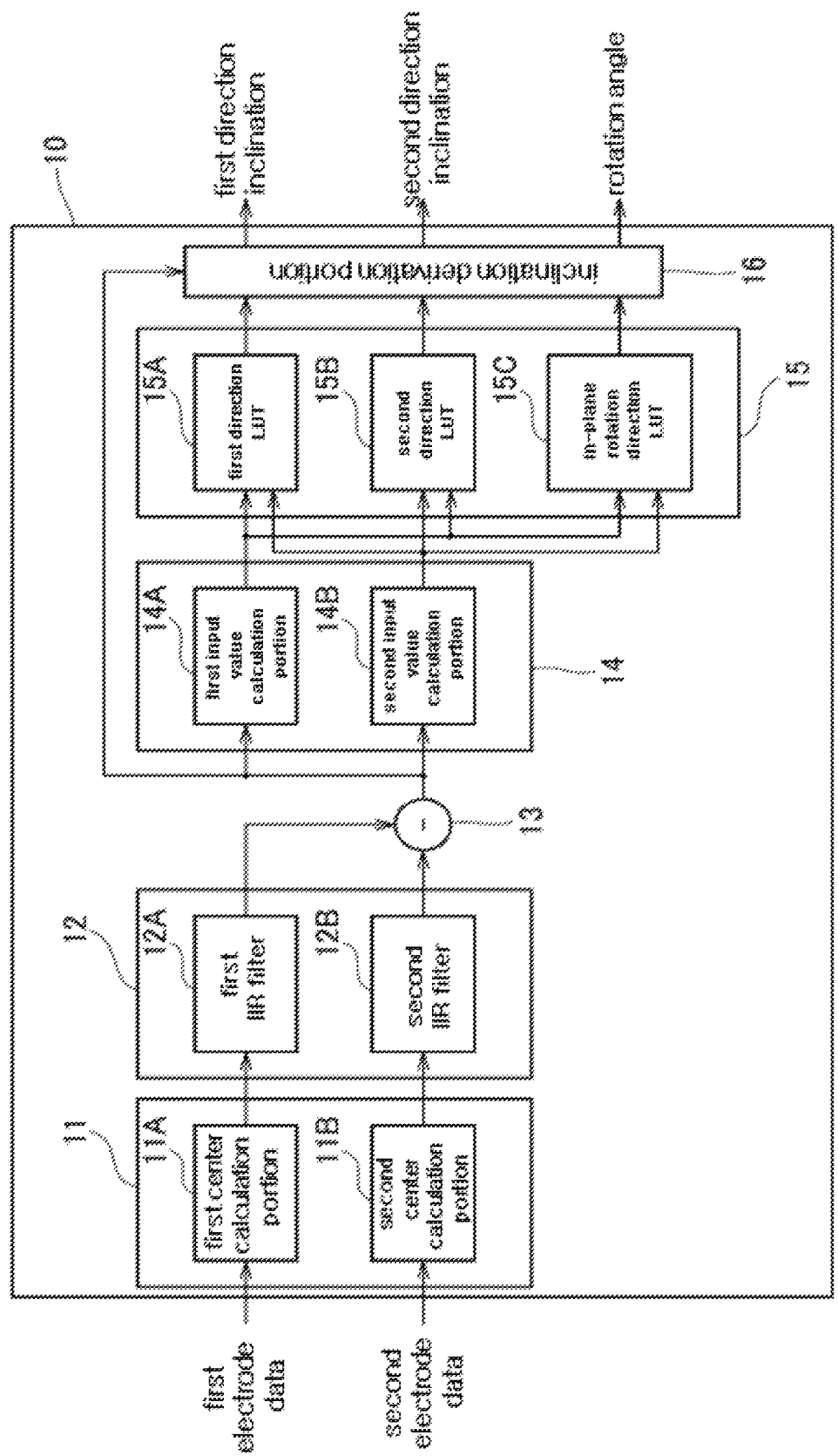
FIG. 3 is a signal processing block diagram of a control portion of an inclination derivation device according to an embodiment of the present invention.

The inclination derivation device 1 includes the control portion 10. FIG. 3 is a signal processing block diagram of the control portion 10 as an example. The control portion 10 includes a center calculation portion 11, a IIR filter 12, a subtractor 13, an input value calculation portion 14, a look-up table (LUT) 15, and an inclination derivation portion 16.

The center calculation portion 11 includes a first center calculation portion 11A and a second center calculation portion 11B.

The first center calculation portion 11A receives the first electrode signals from the input data generation portion 6, calculates a maximum value in each of the direction X and the direction Y, and thus specifies a coordinate on the sensor 2 at which the signal from the first electrode 101a of the pointer 101 is strongest, i.e., a response of the first electrode 101a is strongest.

Further, the first center calculation portion 11A extracts data of a total of 25 coordinates on the sensor 2 with the coordinate, where the response of the first electrode 101a is strongest, as a center, and the 25 coordinates corresponds to 5 first direction conductors 3 and 5 second direction conductors 4. FIG. 4 explains 25 data D1 to D25 extracted above. In the example of FIG. 4, a data corresponding to the coordinate where the response of the first electrode 101a is strongest is a data D13 at the center.

For the 25 data, as shown in the below formula (1), the first center calculation portion 11A adds up a data value (Di) and a coordinate value (xi, yi) on the sensor 2 thus calculates a coordinate value with decimal places in each of the direction X and the direction Y, where the response of the first electrode 101a is strongest, and converts this calculated result into an internal resolution value in each of the direction X and the direction Y used in an internal processing of the display device thus calculates a first electrode tentative coordinate value At(Axt, Ayt). In the formula (1), Nx and Ny are a number of the second direction conductors 4 and a number of the first direction conductors 3, respectively, and Px and Py are internal resolution values in the direction X and the direction Y, respectively.

Formula (1)

$$D_{sum} = \sum_{i=1}^{25} D_i \qquad (1)$$

$$x_{sum} = \sum_{i=1}^{25} D_i \times x_i$$

$$y_{sum} = \sum_{i=1}^{25} D_i \times y_i$$

$$A_{xt} = \frac{x_{sum}}{D_{sum}} \times \frac{P_x}{N_x}$$

$$A_{yt} = \frac{y_{sum}}{D_{sum}} \times \frac{P_y}{N_y}$$

The first center calculation portion 11A transmits the first electrode tentative coordinate value At to the IIR filter 12.

The second center calculation portion 11B receives the second electrode data and calculates a maximum value in each of the direction X and the direction Y in a same way as the first center calculation portion 11A, and thus specifies a coordinate on the sensor 2 at which the signal from the second electrode 101b of the pointer 101 is strongest, i.e., a response of the second electrode 101b is strongest.

Further, in a same way as the first center calculation portion 11A, the second center calculation portion 11B extracts data of a total of 25 coordinates on the sensor 2 with the coordinate, where the response of the second electrode 101b is strongest, as a center, and the 25 coordinates corresponds to 5 first direction conductors 3 and 5 second direction conductors 4.

For the 25 data, in a same way as the first center calculation portion 11A, the second center calculation portion 11B adds up a data value (Di) and a coordinate value (xi, yi) on the sensor 2 thus calculates a coordinate value in each of the direction X and the direction Y, where the response of the second electrode 101b is strongest, and converts this calculated result into an internal resolution value of the display device thus calculates a second electrode tentative coordinate value Bt(Bxt, Byt).

The second center calculation portion 11B transmits the second electrode tentative coordinate value Bt to the IIR filter 12.

The IIR filter 12 includes a first IIR filter 12A and a second IIR filter 12B.

The first IIR filter 12A receives the first electrode tentative coordinate value At from the first center calculation portion 11A, applies an IIR filter of a time direction to reduce a temporal sway, and calculates a first electrode coordinate value A(Ax, Ay).

The first IIR filter 12A transmits the first electrode coordinate value A to the subtractor 13.

The second IIR filter 12B receives the second electrode tentative coordinate value Bt from the second center calculation portion 11B, applies an IIR filter of a time direction to reduce a temporal sway, and calculates a second electrode coordinate value B(Bx, By).

The second IIR filter 12B transmits the second electrode coordinate value B to the subtractor 13.

The subtractor 13 receives the first electrode coordinate value A and the second electrode coordinate value B from the first IIR filter 12A and the second IIR filter 12B, respectively.

The subtractor 13 obtains a difference between the coordinate values A and B, in more detail calculates (Bx−Ax) and (By −Ay), and thus produces a first direction difference Sx and a second direction difference Sy.

The subtractor 13 transmits the first direction difference Sx and the second direction difference Sy to the input value calculation portion 14, and at the same time, transmits a sign value of each of the first direction difference Sx and the second direction difference Sy to the inclination derivation portion 16.

The input value calculation portion 14 calculates values based on the differences Sx and Sy and inputs these values to the LUT 15. The input value calculation portion 14 divides the differences Sx and Sy by a predetermined number, calculates values based on quotients, and in this embodiment, absolute values of the quotients, and inputs these values to the LUT 15.

In more detail, the input value calculation portion 14 includes a first input value calculation portion 14A and a second input value calculation portion 14B.

The first input value calculation portion 14A receives the first direction difference Sx from the subtractor 13, then divides the difference Sx by a predetermined value, for example, a positive value such as 8 and then calculates an absolute value, and thus calculates a first direction normalization difference Rx that is, for example, normalized with 7 bits and a maximum value of 127.

This division may be performed, for example, by bit-shifting the first direction difference Sx in a right direction, in the installed first input value calculation portion 14A.

The first input value calculation portion 14A transmits the first direction normalization difference Rx to the LUT 15.

The second input value calculation portion 14B receives the second direction difference Sy from the subtractor 13, then divides the difference Sy by a predetermined value, for example, a positive value such as 18 and then calculates an absolute value, and thus calculates a second direction normalization difference Ry that is, for example, normalized with 7 bits and a maximum value of 127.

This division may be performed, for example, by bit-shifting the second direction difference Sx in a right direction, in the installed first input value calculation portion 14B.

The second input value calculation portion 14B transmits the second direction normalization difference Ry to the LUT 15.

The input value calculation portion 14 calculates the normalization differences Rx and Ry as the difference-based values, and transmits and inputs the differences Rx and Ry to the LUT 15, and in more detail, to a first direction LUT 15A, a second direction LUT 15B and an in-plane rotation direction LUT 15C.

In the LUT 15, a corresponding relation of values based on the differences Sx and Sy and compensation values that becomes bases of the inclination of the axis C of the pointer 101 is registered.

The values based on the differences Sx and Sy are, in more detail, values based on the quotients obtained by dividing the differences Sx and Sy by a predetermined number, and in this embodiment, absolute values of the quotients, i.e., the first and second direction normalization differences Rx and Ry.

Further, in this embodiment, the compensation value that becomes a base of the inclination of the axis C of the pointer 101 is an absolute value of an inclination.

Figure 5:
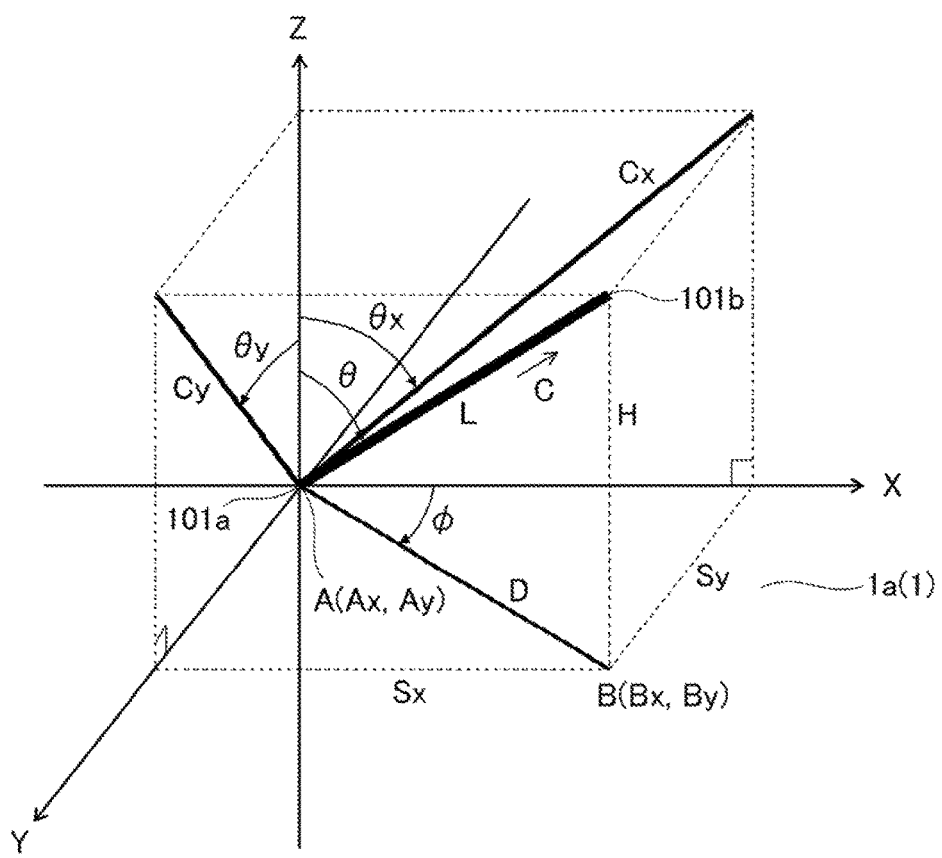
FIG. 5 is a view illustrating a coordinate system according to an inclination derivation device according to the embodiment of the present invention.

FIG. 5 shows a relation of the first and second electrodes 101a and 101b of the pointer 101 and the inclination derivation device 1 as a coordinate system. The XY plane of FIG. 5 corresponds to the position sensing available region 1a of the inclination derivation device 1. When a distance between the first electrode 101a and the second electrode 101b in the direction of the axis C of the pointer 101 is L, a distance D between the first electrode coordinate A and the second electrode coordinate B in the XY plane, and an inclination θ of the axis C from a direction Z perpendicular to the XY plane may be simply derived from the below formula (2).

Formula (2)

$$D = \sqrt{S_x^2 + S_y^2} \qquad (2)$$
$$\theta = \arcsin\frac{D}{L}$$

When, along with or instead of the inclination θ, an inclination θx of the axis C from the direction Z toward the direction X and an inclination θy of the axis C from the direction Z toward the direction Y are derived, a height H of the second electrode 101b from the position sensing available region 1a is derived, based on the inclination θ, from the below formula (3), and then the inclinations θx and θy may be derived from the below formula (4).

Formula (3)

$$H = L\cos\theta \qquad (3)$$

Formula (4)

$$\theta_x = \arctan\frac{S_x}{H} \qquad (4)$$
$$\theta_y = \arctan\frac{S_y}{H}$$

Further, a rotation axis φ of the axis C from the direction X in the XY plane may be derived from the below formula (5).

Formula (5)

$$\phi = \arctan\frac{S_y}{S_x} \qquad (5)$$

Figure 11:
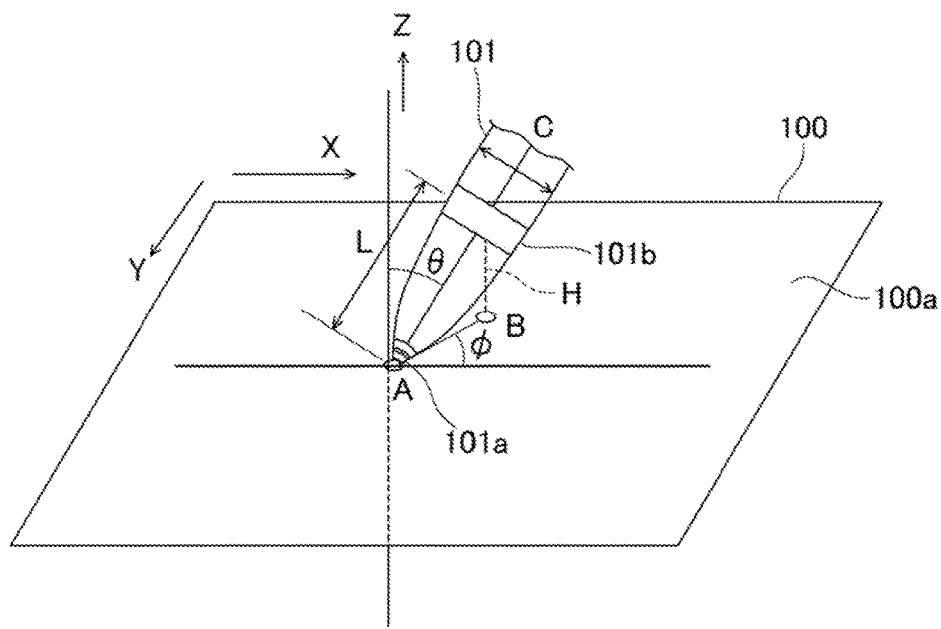
FIG. 11 is a view illustrating an inclination derivation device and a pointer according to the related art.

When the first electrode 101a of the pointer 101 is installed to contact the sensor 2, the second electrode 101b is located away from the sensor 2 (e.g., similar to what is shown in FIG. 11), and thus the detection value of the second electrode 101b by the sensor 2 becomes small. Further, since the second electrode 101b is formed around the axis C with a volume greater than the first electrode 101a, a range to be detected as the second electrode 101b by the sensor 2 is great. As such, the sensor 2 detects a region, where a small detection value are distributed widely, as the position of the second electrode 101b, and thus it is not easy to precisely specifies the detection coordinate B of the second electrode 101b. Accordingly, the second electrode coordinate B output from the second IIR filter 12B and the normalization differences Rx and Ry calculated based on the second electrode coordinate value B in the calculation portion 14 largely have errors. Thus, based on the normalization differences Rx and Ry, when the inclinations are derived by the formulas (2) to (5), the errors are reflected into the derived inclinations.

If a relation between an angle at which the pointer 101 is actually inclined and calculation values including errors of the second electrode coordinate value B and the normalization differences Rx and Ry are known beforehand, the high-precision inclination can be derived from the calculation values including the errors. In other words, for example, in an experiment or the like, an angle is actually measured by inclining the pointer 101, and output values, including errors, of the normalization differences Rx and Ry at the time of the measuring are obtained by an inclination derivation device which is set to output the normalization differences Rx and Ry to an outside from the input value calculation portion 14. Regarding the output values Rx and Ry, the actual inclination of the pointer 101 as an inclination compensation value is corresponded to the output values Rx and Ry, which is stored as a corresponding relation. When actually measuring the inclination, the normalization differences Rx and Ry including errors are calculated by the input value calculation portion 14, and then based on these output values Rx and Ry, a corresponding angle is derived in the corresponding relation, and thus the high-precision inclination of the pointer 101 can be obtained. In the LUT 15, such the corresponding relation is registered.

In more detail, the LUT 15 includes the first direction LUT 15A, the second direction LUT 15B, and the in-plane rotation direction LUT 15C.

The first direction LUT 15A is explained. In this embodiment, since the first direction is the direction X of FIG. 5, a first direction inclination as the inclination of the axis C from the direction Z perpendicular to the sensor 2 toward the first direction X on the sensor 2 corresponds to an angle $\theta x$ in the XZ plane of FIG. 5.

In the first direction LUT 15A, a corresponding relation between the values based on the differences Sx and Sy, i.e., the first direction and second direction normalization differences Rx and Ry, and a compensation value $\theta xt$ that becomes a base of the first direction inclination $\theta x$ as the inclination of the axis C from the direction Z toward the first direction X is registered.

In other words, the first direction inclination $\theta x$ is an inclination of an axis Cx from the direction Z that is a component of the axis C projected onto the XZ plane.

FIG. 6A shows an example of the first LUT 15A. In the table of FIG. 6A, values of the first direction normalization difference Rx are shown in a topmost row, and values of the second direction normalization difference Ry are shown in a leftmost column. For example, a value, 10 is written at a column 10 and a row 5, which means that when the first direction normalization difference Rx is 10 and the second direction normalization difference Ry is 5, the compensation value $\theta xt$, which becomes a value of the first direction inclination $\theta x$, is 10. In other words, this means that, in an experiment, when the first direction normalization difference Rx is 10 and the second direction normalization difference Ry is 5, the pointer 101 is inclined such that the first direction inclination $\theta x$ is 10.

In this embodiment, the maximum value of each of the first and second direction normalization differences Rx and Ry 127, and thus FIG. 6A shows a part of the LUT 15A.

In this embodiment, as shown in FIG. 1, the pointer 101 is formed with a taper shape such that a diameter thereof increases from a front end, where the first electrode 101a is located, toward the direction of the axis C. When the portion of the taper shape has an angle $\alpha$ of 25 degrees with respect to the axis C, in a state that the first electrode 101a contacts the position sensing available region 1a of the inclination derivation device 1, it is impossible to incline the pointer 101 over 25 degrees. In this case, an upper limit of the compensation value $\theta xt$ that becomes a base of the first direction inclination $\theta x$ is 65 degrees. In other words, in this embodiment, a value over the upper limit value, 65 degrees, is not registered in the first direction LUT 15A.

According to the corresponding relation shown in FIG. 6A, the first direction LUT 15A extracts the compensation value $\theta xt$ based on the first and second direction normalization differences Rx and Ry from the input value calculation portion 14 and transmits the compensation value $\theta xt$ to the inclination derivation portion 16.

As shown in FIG. 6A, the compensation value $\theta xt$ registered in the first direction LUT 15A is a value of 0 or greater, i.e., an absolute value of an inclination. In the inclination derivation portion 16, an appropriate sign is assigned to the compensation value $\theta xt$, and the first direction inclination $\theta x$ that the control portion 10 outputs is derived.

The second direction LUT 15B is explained. In this embodiment, since the second direction is the direction Y of FIG. 5, a second direction inclination as the inclination of the axis C from the direction Z perpendicular to the sensor 2 toward the second direction X on the sensor 2 corresponds to an angle $\theta y$ in the YZ plane of FIG. 5.

In the second direction LUT 15B, a corresponding relation between the values based on the differences Sx and Sy, i.e., the first direction and second direction normalization differences Rx and Ry, and a compensation value $\theta yt$ that becomes a base of the second direction inclination $\theta y$ as the inclination of the axis C from the direction Z toward the second direction Y is registered.

In other words, the second direction inclination $\theta y$ is an inclination of an axis Cy from the direction Z that is a component of the axis C projected onto the YZ plane.

In a same way as the first direction LUT 15A, FIG. 6B shows an example of the second LUT 15B.

According to the corresponding relation shown in FIG. 6B, the second direction LUT 15B extracts the compensation value $\theta yt$ based on the first and second direction normalization differences Rx and Ry from the input value calculation portion 14 and transmits the compensation value $\theta yt$ to the inclination derivation portion 16.

In a same way as the first direction LUT 15A, the compensation value $\theta yt$ registered in the second direction LUT 15B is a value of 0 or greater, i.e., an absolute value of an inclination. In the inclination derivation portion 16, an appropriate sign is assigned to the compensation value $\theta yt$, and the second direction inclination $\theta y$ that the control portion 10 outputs is derived.

The in-plane rotation direction LUT 15C is explained. In this embodiment, as shown in FIG. 5, the in-plane rotation direction corresponds to an angle $\phi$ from the first direction X toward the second direction Y on the XY plane i.e., the position sensing available region 1a.

In the in-plane rotation direction LUT 15C, a corresponding relation between the values based on the differences Sx and Sy, i.e., the first direction and second direction normalization differences Rx and Ry, and a compensation value $\phi t$ that becomes a base of the rotation angle $\phi$ on the sensor 2 from a predetermined direction, i.e., the first direction X in this embodiment is registered.

According to the above corresponding relation, the in-plane rotation direction LUT 15C extracts the compensation value $\phi t$ based on the first and second direction normalization differences Rx and Ry from the input value calculation portion 14 and transmits the compensation value $\phi t$ to the inclination derivation portion 16.

The compensation value $\phi t$ registered in the in-plane rotation direction LUT 15C is a value of 0 or greater, and in more detail, 0 to 90 degrees. In the inclination derivation portion 16, a calculation for the compensation value $\phi t$ is conducted, and the rotation angle $\phi$ that the control portion 10 outputs is derived.

The inclination derivation portion 16 performs a decision of signs of the differences Sx and Sy, and based on the sign decision result, assigns signs to the compensation values $\theta xt$ and $\theta yt$, which are output from the LUT 15 and are bases of the inclinations $\theta x$ and $\theta y$, i.e., assigns signs to the absolute values $\theta xt$ and $\theta yt$ of the inclinations $\theta x$ and $\theta y$, and thus derives the inclinations $\theta x$ and $\theta y$.

Further, based on the sign decision result, the inclination derivation portion 16 performs one calculation among 180−$\phi t$, 180+$\phi t$, 360−$\phi t$ for the compensation value $\phi t$, of 0 to 90 degrees, that is output from the LUT 15 and becomes a base of the inclination $\phi$, and thus derives the inclination $\phi$.

In more detail, the inclination derivation portion 16 receives signs of the differences Sx and Sy from the subtractor 13 and the compensation value $\theta xt$ from the first direction LUT 15A, and derives the first direction inclination $\theta x$ from the compensation value $\theta xt$.

Figure 7:
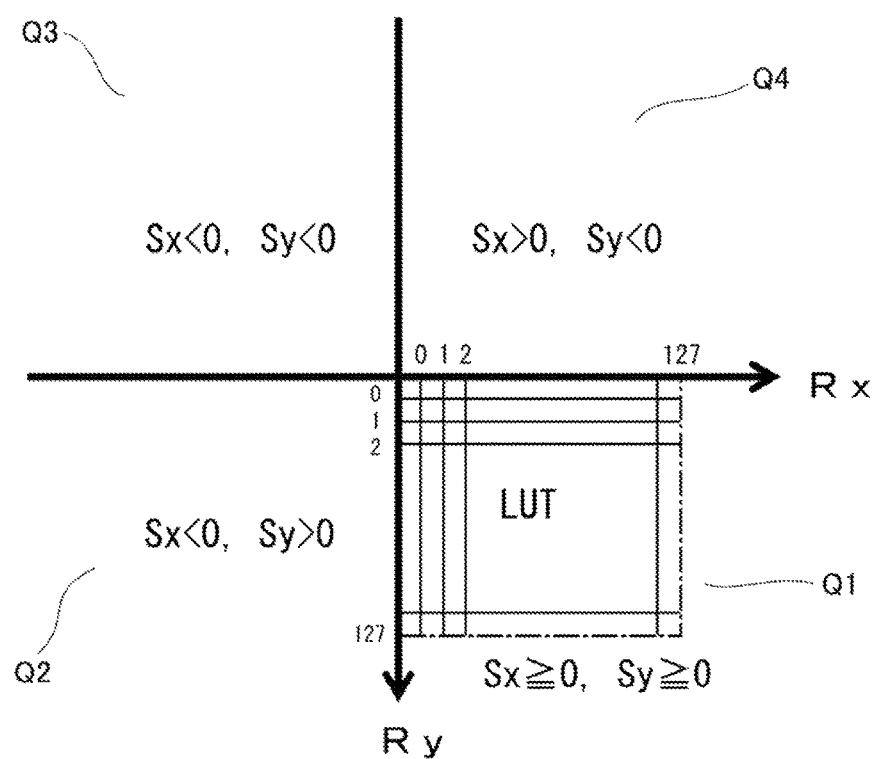
FIG. 7 is a view illustrating an inclination derivation portion of a control portion according to the embodiment of the present invention.

FIG. 7 is a view illustrating the inclination derivation portion 16. In the example of FIG. 7, it is shown that the first direction normalization difference Rx is on the lateral axis, and the second direction normalization difference Ry is on the longitudinal axis. The first and second direction normalization differences Rx and Ry are absolute values of quotients that are the differences Sx and Sy divided by a predetermined positive number thus values of 0 or greater. Thus, the first direction LUT 15A expresses a relation on a first quadrant region Q1, of a right and lower portion of FIG. 7, corresponding to a case that all of the differences Sx and Sy are 0 or greater. In FIG. 7, a portion where values of the first direction LUT 15A exist is shown with an alternate long and short dash line.

When the pointer 101 is inclined to a direction of the first quadrant region Q1 or a direction of a fourth quadrant region Q4 that corresponds to a case that the difference Sx is over 0 and the difference Sy is below 0 thus the difference Sx is 0 or greater, the compensation value θxt, based on the first and second direction normalization differences Rx and Ry, output from the first direction LUT 15A is actually output intactly as the first direction inclination θx.

When the pointer 101 is inclined to a direction of a second quadrant region Q2 that corresponds to a case that the difference Sx is below 0 and the difference Sy is over 0 or a direction of a third quadrant region Q3 that corresponds to a case that all of the differences Sx and Sy are below 0 thus the difference Sx is below 0, the compensation value θxt, based on the first and second direction normalization differences Rx and Ry, output from the first direction LUT 15A is multiplied by −1 to be assigned a negative sign, and this value is output as the first direction inclination θx.

In a same way, the inclination derivation portion 16 receives the compensation value θyt from the second direction LUT 15B, and derives the second direction inclination θy from the compensation value θyt.

Regarding the second direction LUT 15B, when the pointer 101 is inclined to a direction of the first or second quadrant region Q1 or Q2 thus the difference Sy is 0 or greater, the compensation value θyt, based on the first and second direction normalization differences Rx and Ry, output from the second direction LUT 15B is actually output intactly as the second direction inclination θy.

When the pointer 101 is inclined to a direction of the third or fourth quadrant region Q3 or Q4 thus the difference Sy is below 0, the compensation value θyt, based on the first and second direction normalization differences Rx and Ry, output from the second direction LUT 15B is multiplied by −1 to be assigned a negative sign, and this value is output as the second direction inclination θy.

Further, the inclination derivation portion 16 derives the rotation angle φ from the compensation value t from the in-plane rotation direction LUT 15C.

When the pointer 101 is inclined to a direction of the first quadrant region Q1, the compensation value φt, based on the first and second direction normalization differences Rx and Ry, output from the in-plane rotation direction LUT 15C is actually output intactly as the rotation angle φ.

When the pointer 101 is inclined to a direction of the second, third or fourth quadrant region Q2, Q3 or Q4, a rotation angle of 180−φt, a rotation angle of 180+φt or a rotation angle of 360−φt corresponding to the second, third or fourth quadrant region Q2, Q3 or Q4 is calculated from the compensation angle φt, and this value is output as the rotation angle φ. In this regard, referring to FIG. 5, the rotation angle of 180−φt is a rotation angle of a line that is symmetrical to a line AB, which connects the first electrode coordinate value A with the second electrode coordinate value B, with respect to the axis of the second direction Y, the rotation angle of 180+φt is a rotation angle of a line symmetrical to the line AB with respect to the first electrode coordinate value A, and the rotation angle of 360−φt is a rotation angle of a line symmetrical to the line AB with respect to the axis of the first direction X.

An inclination derivation method using the above inclination derivation device 1 is explained with reference to FIGS. 1 to 7 and 11.

When the pointer 101 is located such that the first electrode 101a contacts the position sensing available region 1a of the inclination derivation device 1, the inclination derivation device 1 detects the first electrode 101a and the second electrode 101b using the sensor 2.

In more detail, the selection circuit 5 receives the signals transmitted from the pointer 101 to the sensor 2 through the first direction conductors 3 and the second direction conductors 4.

The selection circuit 5 transmits the signals received from the first and second conductors 3 and 4 to the input data generation portion 6.

The input data generation portion 6 classifies the signals from the selection circuit 5 into the signal from the first electrode 101a and the signal from the second electrode 101b, and transmits the signal from the first electrode 101a as the first electrode signal and the signal from the second electrode 101b as the second electrode signal to the control portion 10.

The first center calculation portion 11A of the control portion 10 receives the first electrode signals from the input data generation portion 6, specifies a coordinate where the signal from the first electrode 101a of the pointer 101 is strongest, i.e., a response of the first electrode 101a is strongest, and calculates the first electrode tentative coordinate value At(Axt, Ayt) from the coordinate of the sensor 2 where the response of the first electrode 101a is strongest.

The first center calculation portion 11A transmits the first electrode tentative coordinate value At to the IIR filter 12.

In a same way as the first center calculation portion 11A, the second center calculation portion 11B receives the first electrode signals, and calculates the second electrode tentative coordinate value Bt(Bxt, Byt), and transmits the second electrode tentative coordinate value Bt to the IIR filter 12.

The first IIR filter 12A receives the first electrode tentative coordinate value At from the first center calculation portion 11A, applies an IIR filter of a time direction, calculates the first electrode coordinate value A(Ax, Ay), and transmits the first electrode coordinate value A to the subtractor 13.

The second IIR filter 12B receives the second electrode tentative coordinate value Bt from the second center calculation portion 11B, applies an IIR filter of a time direction, calculates a second electrode coordinate value B(Bx, By), and transmits the second electrode coordinate value B to the subtractor 13.

The subtractor 13 receives the first electrode coordinate value A and the second electrode coordinate value B from the first IIR filter 12A and the second IIR filter 12B, respectively.

The subtractor 13 calculates the first direction difference Sx and the second direction difference Sy and transmits the differences Sx and Sy to the input value calculation portion 14, and at the same time, transmits a sign value of each of the first direction difference Sx and the second direction difference Sy to the inclination derivation portion 16.

The input value calculation portion 14 calculates values based on the differences Sx and Sy and inputs these values to the LUT 15. The input value calculation portion 14 divides the differences Sx and Sy by a predetermined number, calculates values based on quotients, and in this embodiment, absolute values of the quotients, and inputs these values to the LUT 15.

In more detail, the first input value calculation portion 14A receives the first direction difference Sx from the subtractor 13, then divides the difference Sx by a predetermined value, for example, a positive value such as 8 and then calculates an absolute value, and thus calculates the first direction normalization difference Rx and transmits the first direction normalization difference Rx to the LUT 15.

The second input value calculation portion 14B receives the second direction difference Sy from the subtractor 13, then divides the difference Sy by a predetermined value, for example, a positive value such as 16 and then calculates an absolute value, and thus calculates the second direction normalization difference Ry and transmits the second direction normalization difference Ry to the LUT 15.

As such, the input value calculation portion 14 calculates the normalization differences Rx and Ry as the difference-based values, and transmits and inputs the differences Rx and Ry to the LUT 15, and in more detail, to the first direction LUT 15A, the second direction LUT 15B and the in-plane rotation direction LUT 15C.

According to the corresponding relation shown in FIG. 6A, the first direction LUT 15A extracts the compensation value θxt based on the first and second direction normalization differences Rx and Ry from the input value calculation portion 14 and transmits the compensation value θxt to the inclination derivation portion 16.

According to the corresponding relation shown in FIG. 6B, the second direction LUT 15B extracts the compensation value θyt based on the first and second direction normalization differences Rx and Ry from the input value calculation portion 14 and transmits the compensation value θyt to the inclination derivation portion 16.

The in-plane rotation direction LUT 15C extracts the compensation value φt based on the first and second direction normalization differences Rx and Ry from the input value calculation portion 14 and transmits the compensation value φt to the inclination derivation portion 16.

The inclination derivation portion 16 performs a decision of signs of the differences Sx and Sy, and based on the sign decision result, assigns signs to the compensation values θxt and θyt, which are output from the LUT 15 and are bases of the inclinations θx and θy, i.e., assigns signs to the absolute values θxt and θyt of the inclinations θx and θy, and thus derives the inclinations θx and θy.

Further, based on the sign decision result, the inclination derivation portion 16 performs one calculation among 180−φt, 180+φt, 360−φt for the compensation value φt, of 0 to 90 degrees, that is output from the LUT 15 and becomes a base of the inclination φ, and thus derives the inclination φ.

In more detail, the inclination derivation portion 16 receives the signs of the differences Sx and Sy from the subtractor 13 and the compensation value θxt from the first direction LUT 15A, and derives the first direction inclination θx from the compensation value θxt.

In a same way, the inclination derivation portion 16 receives the compensation value θyt from the second direction LUT 15B, and derives the second direction inclination θy from the compensation value θyt.

Further, the inclination derivation portion 16 derives the rotation angle φ from the compensation value φt from the in-plane rotation direction LUT 15C.

Advantages of the inclination derivation device 1 and the inclination derivation method are explained.

According to the above configuration, in the LUT 15, a corresponding relation between the values Rx and Ry, based on the differences Sx and Sy between the positions of the first and second electrodes 101a and 101b, and the compensation values θxt, θyt and φt as bases of the inclinations θx, θy and φt of the axis C of the pointer is registered.

In more detail, in this embodiment, for example, in an experiment or the like, the an angle is actually measured by inclining the pointer 101, and output values, including errors, of the normalization differences Rx and Ry at the time of the measuring are obtained by an inclination derivation device which is set to output the normalization differences Rx and Ry to an outside from the input value calculation portion 14. Regarding the output values Rx and Ry, the actual inclination of the pointer 101 as an inclination compensation value is corresponded to the output values Rx and Ry, which is contained as a corresponding relation in the LUT 15. In other words, the corresponding relation of the LUT 15 is generated by corresponding the inclination value by actually inclining the pointer 101 and the output values of the input value calculation portion 14 as the compensation value and the normalization differences Rx and Ry.

Accordingly, by factors, such as a minute detection value due to the second electrode 101b being away from the sensor, and a wide detection range due to a shape of the second electrode 101b, even though the second electrode coordinate B output from the second IIR filter 12B and the normalization differences Rx and Ry calculated based on the second electrode coordinate value B in the calculation portion 14 largely have errors, the compensation value solved corresponding to the errors can be contained in the LUT 15 and thus a precision of the inclinations θx, θy and φt can rise.

Further, the inclinations θx, θy and φt can be derived with reference to the LUT 15 not depending on the formulas (2) to (5). Thus, even though the inclination derivation device 1 is loaded into a device, such as a smart phone, that does not have a high processing capability, an amount of circuits can be reduced and the inclinations θx, θy and φt can be derived at high speed.

Further, as the input to the LUT 15, the values Rx and Ry into which, based on the quotients that are the differences Sx and Sy divided by a predetermined number, the original differences Sx and Sy are normalized as smaller values, are used. Thus, the LUT 15 can be realized in a small address space.

Further, the values Rx and Ry input to the LUT 15 are made as the absolute values of the quotients and the corresponding relation between these absolute values and the absolute values θxt, θyt and φt of the inclinations θx, θy and φt is contained in the LUT 15, then the inclination derivation portion 16 performs operations including deciding signs of the differences Sx and Sy and assigning signs to the absolute values θxt, θyt and φt to derive the inclinations θx, θy and φt. Thus, the LUT 15 may only have data corresponding to the first quadrant region Q1 as shown in FIG. 7.

Accordingly, an amount of memory to realize the LUT 15 can be reduced.

<Experiment Result>

An experiment result regarding the above embodiment of the present invention is explained with reference to FIGS. 8A, 8B and 9.

Figure 8A:
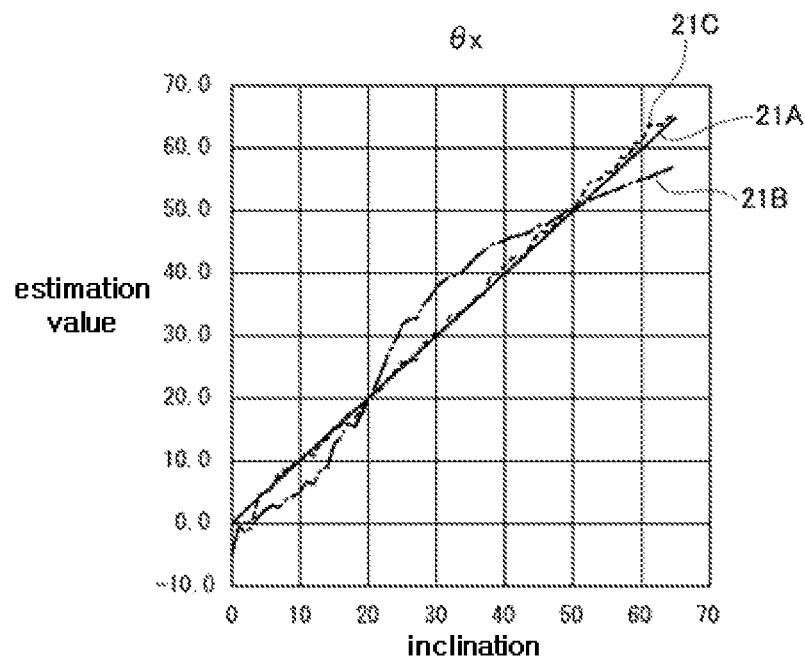

FIG. 8A shows a graph of a derivation result of the first direction inclination θx. In this experiment, with a rotation angle φ of 0 degree and a second direction inclination θy of 0 degree, the first direction inclination θx is measured. In FIG. 8A, a lateral axis indicates an actual angle at which the pointer 101 is inclined with respect to the position sensing available region 1a of the inclination derivation device 1, and a longitudinal axis indicates a derivation value of the first inclination θx in the inclination derivation device 1.

In FIG. 8A, a line 21A is an ideal value, a line 21B is a derivation result of the first direction inclination θx by a control portion deriving an inclination simply using the formulas (2) to (5), and a line 21C is a derivation result of the first direction inclination θx by the control portion 10 of this embodiment. The line 21B is discrepant from the line 21A and its error is large. However, the line 21C mostly follows the line 21A thus its error is reduced compared with the line 21B.

Figure 8B:
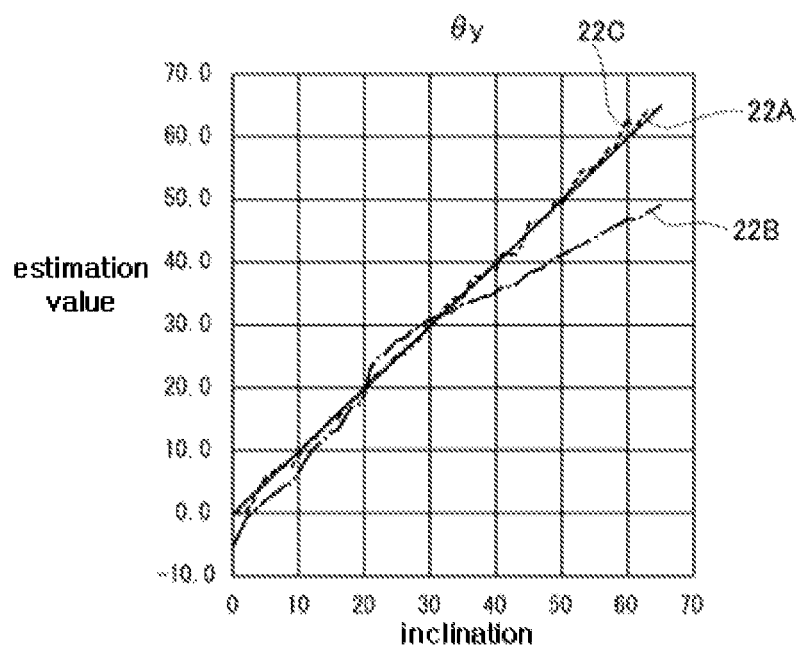

FIG. 8B shows a graph of a derivation result of the second direction inclination θy. In this experiment, with a rotation angle φ of 90 degrees and a first direction inclination θx of 0 degree, the second direction inclination θy is measured. In FIG. 8B, a lateral axis indicates an actual angle at which the pointer 101 is inclined with respect to the position sensing available region 1a of the inclination derivation device 1, and a longitudinal axis indicates a derivation value of the second inclination θy in the inclination derivation device 1.

In FIG. 8B, a line 22A is an ideal value, a line 22B is a derivation result of the second direction inclination θy by a control portion deriving an inclination simply using the formulas (2) to (5), and a line 22C is a derivation result of the second direction inclination θx by the control portion 10 of this embodiment. The line 22B is discrepant from the line 22A and its error is large. However, the line 22C mostly follows the line 22A thus its error is reduced compared with the line 22B.

FIG. 9 shows a table of the experiment result of FIG. 8A. Before a compensation, i.e., in a case of the line 21B at which the first direction inclination θx is derived by a control portion deriving an inclination simply using the formulas (2) to (5), a wide range of error, −8.0 to 7.6 degrees is observed. After a compensation, in a case of the line 21C at which the first direction inclination θx is derived by the control portion 10 of this embodiment, a very narrow range of error, −3.0 to 2.7 degrees, is observed.

Alternative Embodiment

Figure 10:
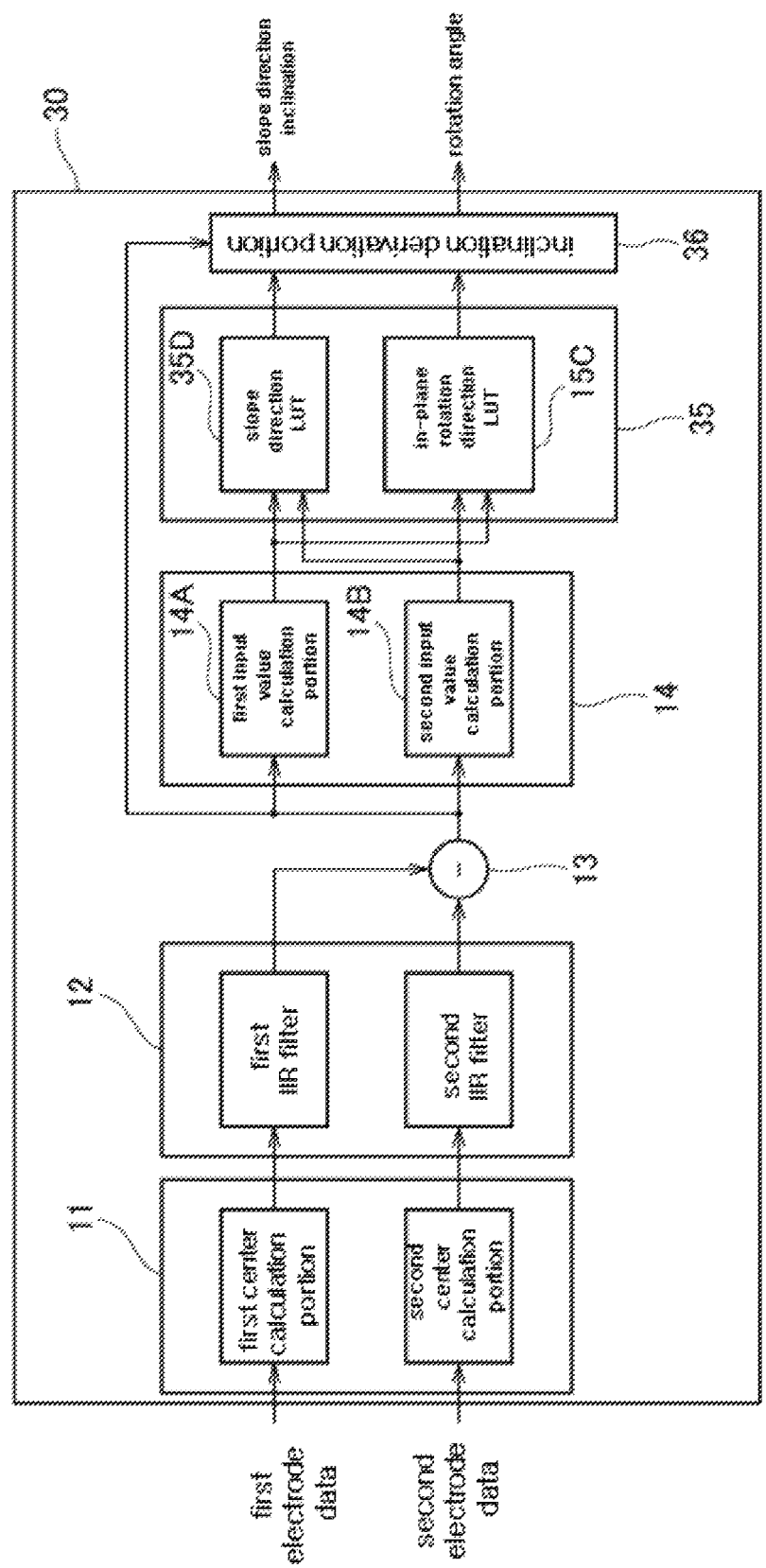
FIG. 10 is a signal processing block diagram of a control portion according to an alternative embodiment of the present invention.

An alternative embodiment (or modified embodiment) to the above inclination derivation device 1 and inclination derivation method of the present invention is explained. FIG. 10 is a signal processing block diagram of a control portion 30 of an inclination derivation device according to an alternative embodiment. Compared with the above embodiment, the control portion 30 is different in that the LUT 35 includes a slope direction LUT 35D instead of the first and second direction LUTs 15A and 15B. In other words, in the LUT 35 of this embodiment includes the slope direction LUT 35D and the in-plane rotation direction LUT 15C.

In a same way of the above embodiment, the input value calculation portion 14 calculates values based on the differences Sx and Sy, and in more detail, calculates the normalization differences Rx and Ry that are absolute values of quotients which are the differences Sx and Sy divided by a predetermined number.

The input value calculation portion 14 inputs the normalization differences Rx and Ry to the LUT 15, and in this embodiment, transmits and inputs the differences Rx and Ry to the slope direction LUT 35D and the in-plane rotation direction LUT 15C.

The slope direction is a direction to which the axis C is inclined from the direction Z normal to the sensor 2. In FIG. 5, the inclination θ of the axis C toward this slope direction is shown as the inclination θ of the slope direction. In the slope direction LUT 35D, a corresponding relation between the normalization differences Rx and Ry as the values based on the differences Sx and Sy and the compensation value θt that becomes a base of the inclination θ of the slope direction is registered. This corresponding relation is generated by corresponding the inclination value by actually inclining the pointer 101 and the output values of the input value calculation portion 14 as the compensation value and the normalization differences Rx and Ry, in a same way as the LUT 15 of the above embodiment.

According to the above corresponding relation, the slope direction LUT 35D extracts the compensation value θt based on the normalization differences Rx and Ry from the input value calculation portion 14, and transmits the compensation value θt to the inclination derivation portion 36.

In a same way as the above embodiment, the in-plane rotation direction LUT 15C receives the normalization differences Rx and Ry from the input value calculation portion 14, extracts the compensation value φt based on the normalization differences Rx and Ry, and transmits the compensation value φt to the inclination derivation portion 36.

The inclination derivation portion 36 outputs the compensation value θt output from the slope direction LUT 35D as the inclination θ of the slope direction.

In a same way as the above embodiment, the inclination derivation portion 16 performs a decision of signs of the differences Sx and Sy, and based on the sign decision result, performs one calculation among 180−φt, 180+φt, 360−φt for the compensation value φt, of 0 to 90 degrees, that is output from the LUT 35 and becomes a base of the inclination φ, and thus derives the inclination φ.

The inclination derivation device and method of this embodiment have substantially the same advantages as the above embodiment.

Further, the inclination derivation device and method of the present invention are not limited to the above embodiments but may be variously modified.

In the above-described embodiments, the inclination derivation device is a table type information terminal. Alternatively, the inclination derivation device may be other type device having a display device and a sensor, such as a smart phone, a stationary type display or the like.

Further, in the above-described embodiments, the second electrode 101b of the pointer 101 is installed with a ring shape surrounding the axis C. Alternatively, a plurality of second electrodes having the same function may be installed with a ring or other shape while the second electrodes being spaced apart from each other along a circumferential direction with the axis C as a center.

Further, in the above-described embodiments, the LUT 15 includes the first direction LUT 15A, the second direction LUT 15B and the in-plane rotation direction LUT 15C, or the LUT 35 includes the slope direction LUT 35D and the in-plane rotation direction LUT 15C. Alternatively, the LUT may includes the first direction LUT 15A and the second direction LUT 15B, or the first direction LUT 15A, the second direction LUT 15B, the in-plane rotation direction LUT 15C, and the slope direction LUT 35D.

Further, in FIG. 6A of the first embodiment, in case of the same first direction normalization difference Rx, even though the second direction normalization difference Ry increases, the compensation value θxt does not change. This is because it is naturally difficult that the first direction normalization difference Rx changes even when the second direction inclination θy, and FIG. 6A shows a part of the first direction LUT 15A by example. Actually, at other part of the first direction LUT 15A, the compensation value θxt changes as the second direction normalization difference Ry increases.

However, for example, by factors such as the location and shape of the second electrode, a change of the compensation value θxt involved by an increase of the second direction normalization difference Ry may be very small. In this case, when there is no problem of a precision, it is possible that the LUT 15A is configured with a one-to-one corresponding relation of the first direction normalization difference Rx to the compensation value rather than with a two-to-one corresponding relation, of the above embodiment, of both the first and second direction normalization differences Rx and Ry to the compensation value. Accordingly, the LUT can be realized with one-dimensional matrix not two-dimensional matrix, and thus a memory usage can be further reduced.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

What is claimed is:

1. An inclination derivation device for a pointer of a pen shape, the pointer including a first electrode installed at an end of an axis and a second electrode installed around the axis, the inclination derivation device comprising:
   a sensor that detects a position of the first electrode and a position of the second electrode; and
   a control portion,
   wherein the control portion includes:
   a look-up table (LUT) in which a corresponding relation of a value based on a difference between the position of the first electrode and the position of the second electrode, and a compensation value that becomes a base of an inclination of the axis of the pointer is registered;
   an input value calculation portion that calculates and inputs the value based on the difference to the LUT; and
   an inclination derivation portion that derives the inclination from the compensation value output from the LUT,
   wherein a corresponding relation of a value based on a quotient that is the difference divided by a predetermined number and the compensation value is registered in the LUT, and
   wherein the input value calculation portion divides the difference by the predetermined number, and calculates and inputs the value based on the quotient to the LUT.

2. The inclination derivation device of claim 1, wherein a corresponding relation of an absolute value of the quotient and an absolute value of the inclination is registered in the LUT,
   wherein the input value calculation portion calculates and inputs the absolute value of the quotient to the LUT, and
   wherein the inclination derivation portion performs a decision of a sign of the difference, and based on the decision of the sign, assigns the sign to the absolute value of the inclination output from the LUT, and derives the inclination.

3. The inclination derivation device of claim 1, wherein the LUT includes a first direction LUT and a second direction LUT,
   wherein a corresponding relation of the value based on the difference, and a compensation value that becomes a base of a first direction inclination of the axis from a normal direction, which is normal to the sensor, toward a first direction on the sensor is registered in the first direction LUT,
   wherein a corresponding relation of the value based on the difference, and a compensation value that becomes a base of a second direction inclination of the axis from the direction toward a second direction, perpendicular to the first direction, on the sensor is registered in the second direction LUT,
   wherein the input value calculation portion calculates and inputs the value based on the difference to the first direction LUT and the second direction LUT, and
   wherein the inclination derivation portion derives the first direction inclination from the compensation value output from the first direction LUT, and derives the second direction inclination from the compensation value output from the second direction LUT.

4. The inclination derivation device of claim 3, wherein the LUT further includes an in-plane rotation direction LUT,
   wherein a corresponding relation between the value based on the difference, and a compensation value that becomes a base of a rotation angle on the sensor from a predetermined direction on the sensor is registered in the in-plane rotation direction LUT,
   wherein the input value calculation portion calculates and inputs the value based on the difference to the in-plane rotation direction LUT, and
   wherein the inclination derivation portion derives the rotation angle from the compensation value output from the in-plane rotation direction LUT.

5. The inclination derivation device of claim 1, wherein the LUT includes a slope direction LUT,
   wherein a corresponding relation of the value based on the difference, and a compensation value that becomes a base of a slope direction inclination of the axis from a normal direction, which is normal to the sensor, toward a slope direction to which the axis is inclined is registered in the slope direction LUT,
   wherein the input value calculation portion calculates and inputs the value based on the difference to the slope direction LUT, and
   wherein the inclination derivation portion outputs the compensation value output from the slope direction LUT as the slope direction inclination.

6. The inclination derivation device of claim 5, wherein the LUT further includes an in-plane rotation direction LUT,
   wherein a corresponding relation between the value based on the difference, and a compensation value that becomes a base of a rotation angle on the sensor from a predetermined direction on the sensor is registered in the in-plane rotation direction LUT,
   wherein the input value calculation portion calculates and inputs the value based on the difference to the in-plane rotation direction LUT, and
   wherein the inclination derivation portion derives the rotation angle from the compensation value output from the in-plane rotation direction LUT.

7. The inclination derivation device of claim 1, wherein the sensor has a plane shape.

8. An inclination derivation method for a pointer of a pen shape that includes a first electrode installed at an end of an axis and a second electrode installed around the axis, the inclination derivation method comprising:

detecting a position of the first electrode and a position of the second electrode by a sensor;

calculating a value based on a difference between the position of the first electrode and the position of the second electrode;

inputting the value based on the difference to a look-up table (LUT) in which a corresponding relation of the value based on the difference and a compensation value that becomes a base of an inclination of the axis of the pointer is registered; and deriving the inclination from the compensation value output from the LUT, wherein a corresponding relation of a value based on a quotient that is the difference divided by a predetermined number and the compensation value is registered in the LUT, and wherein the difference is divided by the predetermined number, and the value based on the quotient is calculated and input to the LUT.

9. The inclination derivation method of claim 8, wherein a corresponding relation of an absolute value of the quotient and an absolute value of the inclination is registered in the LUT, wherein the absolute value of the quotient is calculated and input to the LUT, and wherein a decision of a sign of the difference is performed, and based on the decision of the sign, the sign is assigned to the absolute value of the inclination output from the LUT, and the inclination is derived.

10. The inclination derivation method of claim 8, wherein the LUT includes a first direction LUT and a second direction LUT, wherein a corresponding relation of the value based on the difference, and a compensation value that becomes a base of a first direction inclination of the axis from a normal direction, which is normal to the sensor, toward a first direction on the sensor is registered in the first direction LUT, wherein a corresponding relation of the value based on the difference, and a compensation value that becomes a base of a second direction inclination of the axis from the direction toward a second direction, perpendicular to the first direction, on the sensor is registered in the second direction LUT, wherein the value based on the difference is calculated and input to the first direction LUT and the second direction LUT, and wherein the first direction inclination is derived from the compensation value output from the first direction LUT, and the second direction inclination is derived from the compensation value output from the second direction LUT.

11. The inclination derivation method of claim 10, wherein the LUT further includes an in-plane rotation direction LUT, wherein a corresponding relation between the value based on the difference, and a compensation value that becomes a base of a rotation angle on the sensor from a predetermined direction on the sensor is registered in the in-plane rotation direction LUT, wherein the value based on the difference is calculated and input to the in-plane rotation direction LUT, and wherein the rotation angle is derived from the compensation value output from the in-plane rotation direction LUT.

12. The inclination derivation method of claim 8, wherein the LUT includes a slope direction LUT, wherein a corresponding relation of the value based on the difference, and a compensation value that becomes a base of a slope direction inclination of the axis from a normal direction, which is normal to the sensor, toward a slope direction to which the axis is inclined is registered in the slope direction LUT, wherein the value based on the difference is calculated and input to the slope direction LUT, and wherein the compensation value output from the slope direction LUT is output as the slope direction inclination.

13. The inclination derivation method of claim 12, wherein the LUT further includes an in-plane rotation direction LUT, wherein a corresponding relation between the value based on the difference, and a compensation value that becomes a base of a rotation angle on the sensor from a predetermined direction on the sensor is registered in the in-plane rotation direction LUT, wherein the value based on the difference is calculated and input to the in-plane rotation direction LUT, and wherein the rotation angle is derived from the compensation value output from the in-plane rotation direction LUT.

14. The inclination derivation method of claim 8, wherein the sensor has a plane shape.

15. An inclination derivation device for a pointer of a pen shape, the pointer including a first electrode installed at an end of an axis and a second electrode installed around the axis, the inclination derivation device comprising:

a sensor that detects a position of the first electrode and a position of the second electrode; and a control portion, wherein the control portion includes:

a look-up table (LUT) in which a corresponding relation of a value based on a difference between the position of the first electrode and the position of the second electrode, and a compensation value that becomes a base of an inclination of the axis of the pointer is registered;

an input value calculation portion that calculates and inputs the value based on the difference to the LUT; and an inclination derivation portion that derives the inclination from the compensation value output from the LUT, wherein the LUT includes a first direction LUT and a second direction LUT, wherein a corresponding relation of the value based on the difference, and a compensation value that becomes a base of a first direction inclination of the axis from a normal direction, which is normal to the sensor, toward a first direction on the sensor is registered in the first direction LUT, wherein a corresponding relation of the value based on the difference, and a compensation value that becomes a base of a second direction inclination of the axis from the direction toward a second direction, perpendicular to the first direction, on the sensor is registered in the second direction LUT, wherein the input value calculation portion calculates and inputs the value based on the difference to the first direction LUT and the second direction LUT, and wherein the inclination derivation portion derives the first direction inclination from the compensation value output from the first direction LUT, and derives the second direction inclination from the compensation value output from the second direction LUT.

16. An inclination derivation device for a pointer of a pen shape, the pointer including a first electrode installed at an end of an axis and a second electrode installed around the axis, the inclination derivation device comprising:
- a sensor that detects a position of the first electrode and a position of the second electrode; and
- a control portion,
- wherein the control portion includes:
- a look-up table (LUT) in which a corresponding relation of a value based on a difference between the position of the first electrode and the position of the second electrode, and a compensation value that becomes a base of an inclination of the axis of the pointer is registered;
- an input value calculation portion that calculates and inputs the value based on the difference to the LUT; and
- an inclination derivation portion that derives the inclination from the compensation value output from the LUT,
- wherein the LUT includes a slope direction LUT,
- wherein a corresponding relation of the value based on the difference, and a compensation value that becomes a base of a slope direction inclination of the axis from a normal direction, which is normal to the sensor, toward a slope direction to which the axis is inclined is registered in the slope direction LUT,
- wherein the input value calculation portion calculates and inputs the value based on the difference to the slope direction LUT, and
- wherein the inclination derivation portion outputs the compensation value output from the slope direction LUT as the slope direction inclination.

17. An inclination derivation method for a pointer of a pen shape that includes a first electrode installed at an end of an axis and a second electrode installed around the axis, the inclination derivation method comprising:
- detecting a position of the first electrode and a position of the second electrode by a sensor;
- calculating a value based on a difference between the position of the first electrode and the position of the second electrode;
- inputting the value based on the difference to a look-up table (LUT) in which a corresponding relation of the value based on the difference and a compensation value that becomes a base of an inclination of the axis of the pointer is registered; and
- deriving the inclination from the compensation value output from the LUT,
- wherein the LUT includes a first direction LUT and a second direction LUT,
- wherein a corresponding relation of the value based on the difference, and a compensation value that becomes a base of a first direction inclination of the axis from a normal direction, which is normal to the sensor, toward a first direction on the sensor is registered in the first direction LUT,
- wherein a corresponding relation of the value based on the difference, and a compensation value that becomes a base of a second direction inclination of the axis from the direction toward a second direction, perpendicular to the first direction, on the sensor is registered in the second direction LUT,
- wherein the value based on the difference is calculated and input to the first direction LUT and the second direction LUT, and
- wherein the first direction inclination is derived from the compensation value output from the first direction LUT, and the second direction inclination is derived from the compensation value output from the second direction LUT.

18. An inclination derivation method for a pointer of a pen shape that includes a first electrode installed at an end of an axis and a second electrode installed around the axis, the inclination derivation method comprising:
- detecting a position of the first electrode and a position of the second electrode by a sensor;
- calculating a value based on a difference between the position of the first electrode and the position of the second electrode;
- inputting the value based on the difference to a look-up table (LUT) in which a corresponding relation of the value based on the difference and a compensation value that becomes a base of an inclination of the axis of the pointer is registered; and
- deriving the inclination from the compensation value output from the LUT,
- wherein the LUT includes a slope direction LUT,
- wherein a corresponding relation of the value based on the difference, and a compensation value that becomes a base of a slope direction inclination of the axis from a normal direction, which is normal to the sensor, toward a slope direction to which the axis is inclined is registered in the slope direction LUT,
- wherein the value based on the difference is calculated and input to the slope direction LUT, and
- wherein the compensation value output from the slope direction LUT is output as the slope direction inclination.

* * * * *